(12) United States Patent
Sugawara et al.

(10) Patent No.: US 9,307,348 B2
(45) Date of Patent: Apr. 5, 2016

(54) STORAGE MEDIUM HAVING STORED THEREIN COMMUNICATION PROGRAM, INFORMATION PROCESSING APPARATUS, COMMUNICATION SYSTEM, COMMUNICATION METHOD, AND STORAGE MEDIUM HAVING COMMUNICATION FUNCTION

(71) Applicant: NINTENDO CO., LTD., Kyoto (JP)

(72) Inventors: Atsushi Sugawara, Kyoto (JP); Tatsuhiro Shirai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 106 days.

(21) Appl. No.: 13/937,836

(22) Filed: Jul. 9, 2013

(65) Prior Publication Data
US 2014/0170973 A1 Jun. 19, 2014

(30) Foreign Application Priority Data
Dec. 13, 2012 (JP) ................................ 2012-272549

(51) Int. Cl.
*H04W 4/00* (2009.01)
*H04L 29/08* (2006.01)
*H04L 29/06* (2006.01)

(52) U.S. Cl.
CPC ........... *H04W 4/008* (2013.01); *H04L 67/1095* (2013.01); *H04L 69/24* (2013.01)

(58) Field of Classification Search
CPC .................................................. H04W 4/008
USPC .............................................. 455/41.1, 41.2
See application file for complete search history.

(56) References Cited

U.S. PATENT DOCUMENTS

| 2011/0165859 A1 | 7/2011 | Wengrovitz |
| 2011/0275316 A1 | 11/2011 | Suumäki et al. |
| 2014/0065957 A1* | 3/2014 | Gupta et al. ................. 455/41.1 |

FOREIGN PATENT DOCUMENTS

| EP | 2 106 107 | * | 9/2009 | ............ H04M 1/725 |
| EP | 2 706 772 A1 | | 3/2014 | |
| EP | 2 753 055 A2 | | 7/2014 | |
| JP | 2000/163524 | | 6/2000 | |
| WO | WO 2009/047939 | | 4/2009 | |

OTHER PUBLICATIONS

Enrique Ortiz: "An Introduction to Near-Field Communication and the Contactless Communication API", Jun. 30, 2008, Retrieved from the Internet: URL:http://www.oracle.com/technetwork/articles/javame/nfc-140183.html [retrieved on Apr. 1, 2014], 9 pages.
Josh-Wyatt: "Application Report Implementing an SSP A2DP Bluetooth Audio Receiver Using NFC With TRF7970A", Jun. 30, 2012, Texas Instrument Web Site, Retrieved from the Internet: URL:http://www.ti.com/lit/an/sloa169/sloa169.pdf [retrieved on Apr. 2, 2014] 37 pages.
Office Action in corresponding European Application No. 13175712.2 dated Dec. 8, 2014.

* cited by examiner

*Primary Examiner* — Tuan H Nguyen
(74) *Attorney, Agent, or Firm* — Nixon & Peabody, P.C.

(57) ABSTRACT

An example of an information processing apparatus performs near field communication with a communication target. An example of a communication target has stored therein main data to be read, identification information, and status information set in accordance with writing of the main data to the communication target. In accordance with the fact that, as a result of the communication target coming close to the information processing apparatus, the information processing apparatus has become capable of performing near field communication with the communication target, the information processing apparatus reads the identification information and the status information from the communication target. Further, the information processing apparatus determines, on the basis of the read identification information and status information, whether or not it is necessary to read the main data.

17 Claims, 12 Drawing Sheets

Fig.9

| IDENTIFICATION INFORMATION (UID) | STATUS INFORMATION (COUNTER) |
|---|---|
| ○○○○ | 3 |
| × × × × | 5 |
| △△△△ | 2 |
| ⋮ | ⋮ |

STORAGE MEDIUM HAVING STORED THEREIN COMMUNICATION PROGRAM, INFORMATION PROCESSING APPARATUS, COMMUNICATION SYSTEM, COMMUNICATION METHOD, AND STORAGE MEDIUM HAVING COMMUNICATION FUNCTION

CROSS REFERENCE TO RELATED APPLICATION

The disclosure of Japanese Patent Application No. 2012-272549, filed on Dec. 13, 2012, is incorporated herein by reference.

FIELD

The technology relates to a storage medium having stored therein a communication program for performing near field communication with a communication target, an information processing apparatus, a communication system, and a communication method for performing near field communication with a communication target, and a storage medium having a communication function for performing near field communication with a communication target.

BACKGROUND AND SUMMARY

Conventionally, there is a technique of performing communication between apparatuses, using near field communication such as NFC (Near Field Communication). In near field communication, in accordance with the fact that a communication target, which is another communication apparatus, has come close to a communication apparatus, the communication target is specified, and communication is started between the communication apparatus and the communication target.

In conventional near field communication, every time any communication target (for example, an NFC tag) comes close to an information processing apparatus (for example, an NFC reader/writer) that communicates, communication is established between the communication target and the information processing apparatus, and data is transmitted and received. Conventionally, there is a case where unnecessary communication is performed for the same communication target, which prevents efficient near field communication.

Therefore, the present application discloses a storage medium having stored therein a communication program capable of efficiently performing near field communication, an information processing apparatus, a communication system, and a communication method that are capable of efficiently performing near field communication, and a storage medium having a communication function capable of efficiently performing near field communication.

(1)
An example of a storage medium according to the present specification is a non-transitory computer-readable storage medium having stored therein a communication program to be executed by a computer of an information processing apparatus capable of performing near field communication with a communication target.

The communication target has stored therein main data to be read, identification information unique to each communication target, and status information set in accordance with writing of the main data to the communication target.

The communication program causes the computer to execute reading and determination.

In accordance with the fact that, as a result of the communication target coming close to the information processing apparatus, the information processing apparatus has become capable of performing near field communication with the communication target, the computer reads the identification information and the status information of the communication target from the communication target.

The computer determines, on the basis of the read identification information and status information, whether or not it is necessary to read the main data from the communication target.

(2)
It may be determined, on the basis of the read identification information and status information, whether or not the main data from the communication target having become capable of communicating with the information processing apparatus has already been acquired, thereby determining whether or not it is necessary to read the main data from the communication target.

(3)
The communication program may further cause the computer to execute: if it has been determined that the main data has already been acquired, not reading the main data from the communication target; and if it has been determined that the main data has not yet been acquired, reading the main data from the communication target.

(4)
The communication program may further cause the computer to execute, if the main data has been read from the communication target, saving the read main data in a storage section of the information processing apparatus. If it has been determined that the main data has already been acquired, the main data saved in the storage section is used as the main data read from the communication target.

(5)
When the main data is written to the communication target, the main data may be saved in the storage section.

(6)
The communication program may further cause the computer to execute saving the read status information in a storage section of the information processing apparatus in association with the identification information with respect to each communication target. Regarding the communication target corresponding to the identification information read from the communication target, if the read status information matches the status information saved in the storage section, it is determined that it is not necessary to read the main data, and if the read status information does not match the status information saved in the storage section, it is determined that it is necessary to read the main data.

(7)
The communication program may further cause the computer to execute, when the main data is written to the communication target, updating a content of the status information stored in the communication target.

(8)
When an instruction to communicate with the communication target has been given by an application executed by the information processing apparatus, the identification information and the status information may be read from the communication target. Further, when an instruction to communicate with the communication target has been given by an application executed by the information processing apparatus, if it has been determined that the main data has already been acquired, the main data may not be read from the communication target.

(9)

When an instruction to read the main data from the communication target has been given by the application, the identification information and the status information may be read from the communication target. Further, when an instruction to read the main data from the communication target has been given by the application, if it has been determined that main data has already been acquired, the main data may not be read from the communication target.

(10)

When an instruction to rewrite the main data to the communication target has been given by the application, the identification information and the status information may be read from the communication target. Further, when an instruction to rewrite the main data to the communication target has been given by the application, if it has been determined that the main data has not yet been acquired, the main data to be rewritten may be read from the communication target, and if it has been determined that the main data has already been acquired, the main data may not be read from the communication target.

(11)

The status information may be information uniquely set in accordance with the number of times data has been written to the communication target.

(12)

The status information may be at least one of counter information indicating the number of times data has been written to the communication target and time information indicating a time when data has been written to the communication target.

(13)

A total data size of the identification information and the status information may be smaller than a data size of the main data.

It should be noted that the present specification discloses an example of an information processing apparatus including functions equivalent to those of the information processing apparatus according to the above configurations (1) through (13), and discloses an example of a communication system including the communication target (a communication target apparatus) and the information processing apparatus according to the above configurations (1) through (13). Further, the present specification discloses a communication method to be performed by the information processing apparatus according to the above configurations (1) through (13).

In addition, the present specification discloses an example of a storage medium including functions equivalent to those of the communication target according to the above configurations (1) through (13). Here, the storage medium may be in the form of being used mainly as storage means, such as an IC card, or may be in the form of being built into an information processing apparatus (for example, an information processing apparatus having an NFC card emulation function).

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing a non-limiting example of a status information table;

DETAILED DESCRIPTION OF NON-LIMITING EXAMPLE EMBODIMENTS

[1. Configuration of Communication System]

Figure 1:
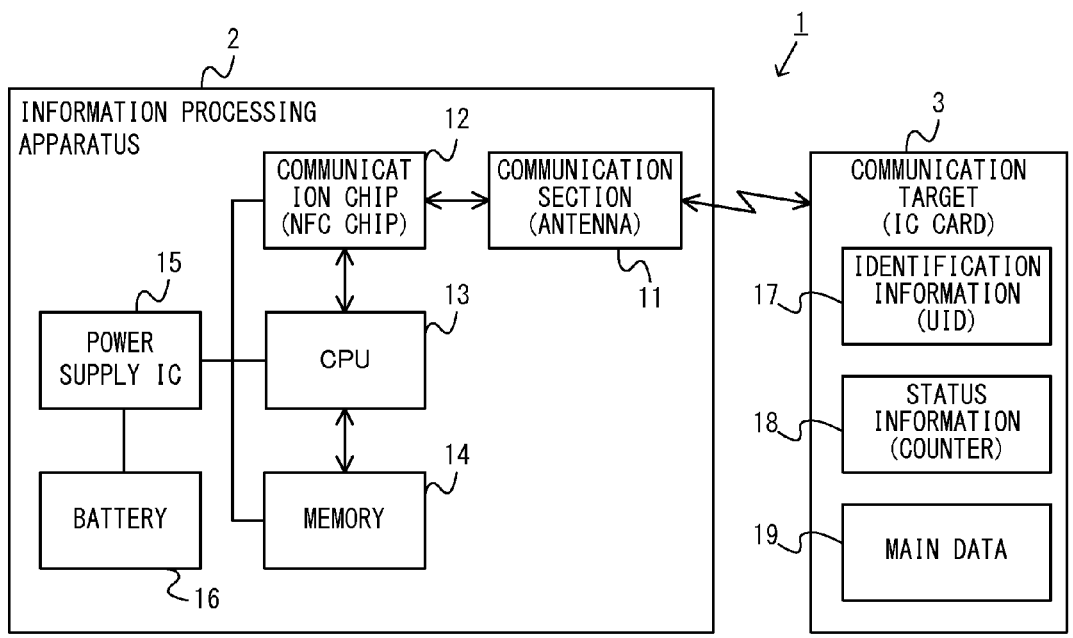
FIG. 1 is a diagram showing a non-limiting example of the configuration of a communication system according to an exemplary embodiment.

A description is given below of a communication program, an information processing apparatus, a communication system, a communication method, and a storage medium according to an exemplary embodiment. First, the configuration of the communication system is described. FIG. 1 is a diagram showing an example of the configuration of the communication system according to the exemplary embodiment. As shown in FIG. 1, a communication system 1 includes an information processing apparatus 2 and a communication target 3. The information processing apparatus 2 may be any information processing apparatus capable of performing near field communication with the communication target 3.

In the exemplary embodiment, a description is given taking as an example the case where, as exemplary near field communication, communication based on the NFC standard is performed between the information processing apparatus 2 and the communication target 3. Here, "near field communication" as used herein refers to a communication method where radio waves from an apparatus develop an electromotive force (for example, by electromagnetic induction) in another apparatus. The other apparatus can operate by the developed electromotive force (the other apparatus may or may not have a power supply). In near field communication, when the information processing apparatus 2 and the communication target 3 have come close to each other (typically, the distance between the information processing apparatus 2 and the communication target 3 has become dozen centimeters or less), the information processing apparatus 2 and the communication target 3 become capable of communicating with each other. Near field communication in the exemplary embodiment is a communication method also referred to as "contactless communication". Further, in near field communication in the exemplary embodiment, radio waves continue to be transmitted while the communication between two communication apparatuses is established (a communication target, which is another communication apparatus, is close to a communication apparatus).

The information processing apparatus 2 may be any information processing apparatus capable of performing near field communication. In the exemplary embodiment, the information processing apparatus 2 is a handheld (or portable) apparatus such as a handheld game apparatus, a mobile phone, or a smartphone. For example, the information processing apparatus 2 is a portable device having the function of an NFC reader/writer.

The communication target 3 may be any apparatus capable of performing near field communication with the information processing apparatus 2. In the exemplary embodiment, the communication target 3 is a storage medium (for example, an IC card) having the function of an NFC tag. The description is given below taking as an example the case where the communication target 3 is an IC card. The communication target 3, however, is not limited to a storage medium such as an IC card, and may be, for example, an information processing apparatus (a portable device) having an NFC card emulation function.

The configuration of the information processing apparatus 2 is described below. As shown in FIG. 1, the information processing apparatus 2 includes a communication section 11. The communication section 11 is an antenna used for near field communication. Further, the information processing apparatus 2 includes a communication chip 12. In accordance with an instruction from a CPU 13 described later, the communication chip 12 generates a signal (radio waves) to be transmitted from the communication section 11. The generated signal is transmitted from the communication section 11. The communication chip 12 is, for example, an NFC chip.

As shown in FIG. 1, the information processing apparatus 2 includes a CPU 13 and a memory 14. The CPU 13 is an information processing section for performing various types of information processing performed by the information processing apparatus 2. The CPU 13 performs the various types of information processing using the memory 14. It should be noted that although not shown in the figures, the information processing apparatus 2 may include an input section (a button, a touch panel, and the like) that receives an instruction from a user, and/or a display apparatus that displays an image generated by the various types of information processing.

It should be noted that the information processing apparatus 2 may include a plurality of apparatuses. For example, in another embodiment, a plurality of apparatuses capable of communicating with each other via a network (a wide-area network and/or a local network) may perform in a dispersed manner at least part of the information processing performed by the information processing apparatus 2. Alternatively, for example, the information processing apparatus 2 may be configured such that an apparatus including the communication section 11 and the communication chip 12 is detachably attached to an apparatus including the CPU 13 and the memory 14.

Figure 10:
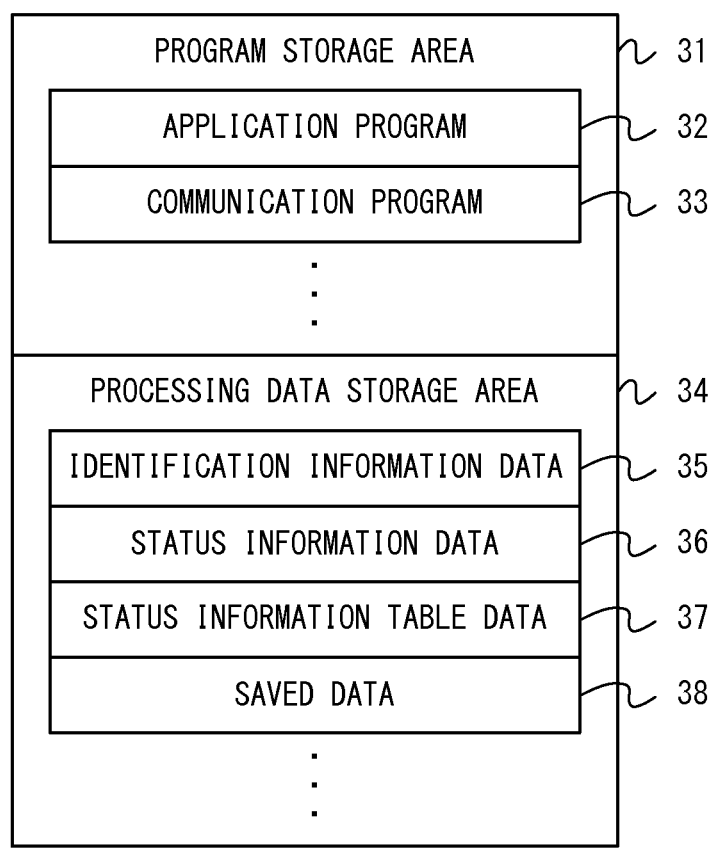
FIG. 10 is a diagram showing a non-limiting example of a data area set in a memory of the information processing apparatus.

In the exemplary embodiment, in the information processing apparatus 2, the CPU 13 executes at least two types of programs, namely an application program and a communication program (see FIG. 10). The application program may be a program for executing any application for performing data communication with the communication target (IC card) 3. The application program may be, for example, a game program for reading game data from the IC card 3 and performing game processing using the game data. The communication program is a program for performing near field communication with the IC card 3. For example, the communication program is firmware for causing the communication chip 12 to operate. Although described in detail later, the communication program receives an instruction from an application and causes the communication chip 12 to perform an operation for communication. It should be noted that if the information processing apparatus 2 can execute a plurality of application programs, the communication program is used in all the applications in a shared manner. That is, the communication program (a communication control section described later) can receive instructions regarding communication from the plurality of applications.

As shown in FIG. 1, the information processing apparatus 2 includes a battery 16 and a power supply IC 15. The power supply IC 15 supplies power from the battery 16 to components of the information processing apparatus 2. In the exemplary embodiment, the power supply IC 15 supplies power to at least the communication chip 12, the CPU 13, and the memory 14. Thus, a reduction in the power consumption of the communication chip 12, the CPU 13, and the memory 14 when near field communication is performed makes it possible to reduce the power consumption of the battery 16.

In addition, the IC card 3 stores identification information 17 and status information 18. The identification information 17 is information capable of identifying an individual communication target (IC card) 3. In other words, the identification information 17 is information unique to (individually assigned to) each communication target 3. In the exemplary embodiment, the identification information 17 is a UID (Unique ID) in NFC.

The status information 18 is information set in accordance with the writing of data to the IC card 3 (information that is changed in accordance with the writing of data). In the exemplary embodiment, the status information 18 is a counter indicating the number of times data has been written to the IC card 3.

In addition, the IC card 3 stores, as well as the identification information 17 and the status information 18, data (hereinafter referred to as "main data") 19 to be read by the information processing apparatus 2. The main data 19 is data that is stored in advance in the IC card 3, or written by the other apparatus (including the information processing apparatus 2) with which near field communication is performed. The main data 19 is data indicating information different from the identification information 17 and the status information 18. In the exemplary embodiment, the main data 19 is used in an application executed by the information processing apparatus 2. That is, during the execution of the application, the information processing apparatus 2 reads the main data 19 from the IC card 3, or writes, to the IC card 3, data to be stored as the main data 19.

It should be noted that in the exemplary embodiment, data is written to and read from the IC card 3 with the entirety of the main data 19 as a unit. That is, when the main data 19 is read, the entirety of the main data 19 is read (even if only part of the main data 19 is required). Further, when data is written to the IC card 3 (the main data 19 is rewritten), the entirety of the main data 19 is rewritten (even if only part of the main data 19 is rewritten).

[2. Operation of Communication System]

(2-1: Overview of Operation)

Next, with reference to FIGS. 2 through 8, the operation of the communication system 1 regarding communication is described. It should be noted that as shown in FIGS. 2 through 8, in the exemplary embodiment, the operation of the information processing apparatus 2 is described by separating an application section 21 and a communication control section 22 on the basis of their functions. In the exemplary embodiment, the application section 21 is the CPU 13 that executes the application program described above. The communication control section 22 is achieved by the CPU 13 that executes the communication program, the communication chip 12, and the communication section 11. It should be noted that in another embodiment, the information processing performed by the information processing apparatus 2 may not need to be achieved by two types of programs, namely the application program and the communication program, and may be achieved by a single program.

(Case A: Case Where Communication is Performed for First Time)

Figure 2:
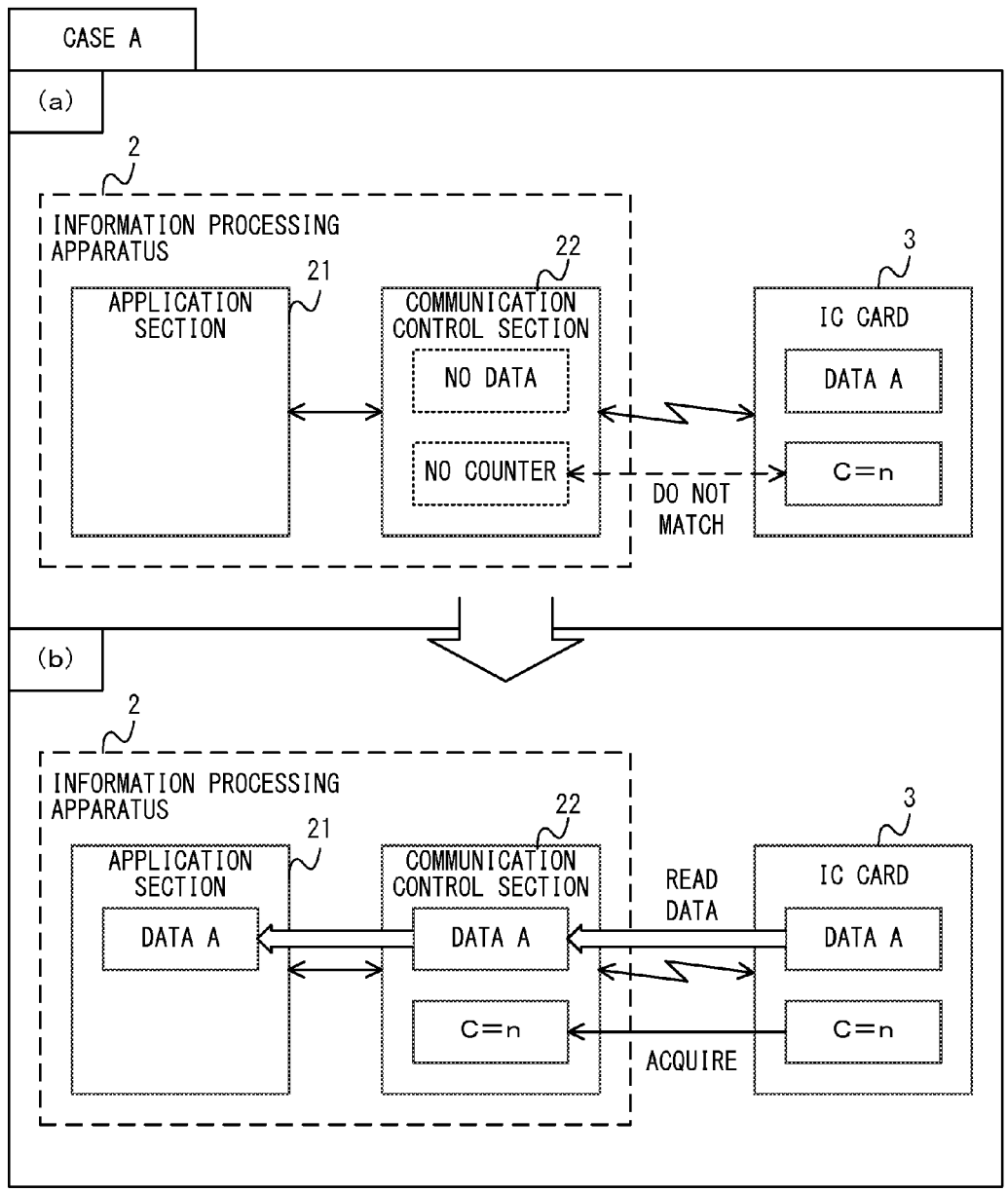
FIG. 2 is a diagram showing non-limiting examples of states before and after the operation of the communication system in the case where an example of an information processing apparatus and an example of a communication target communicate with each other for the first time.
Figure 3:
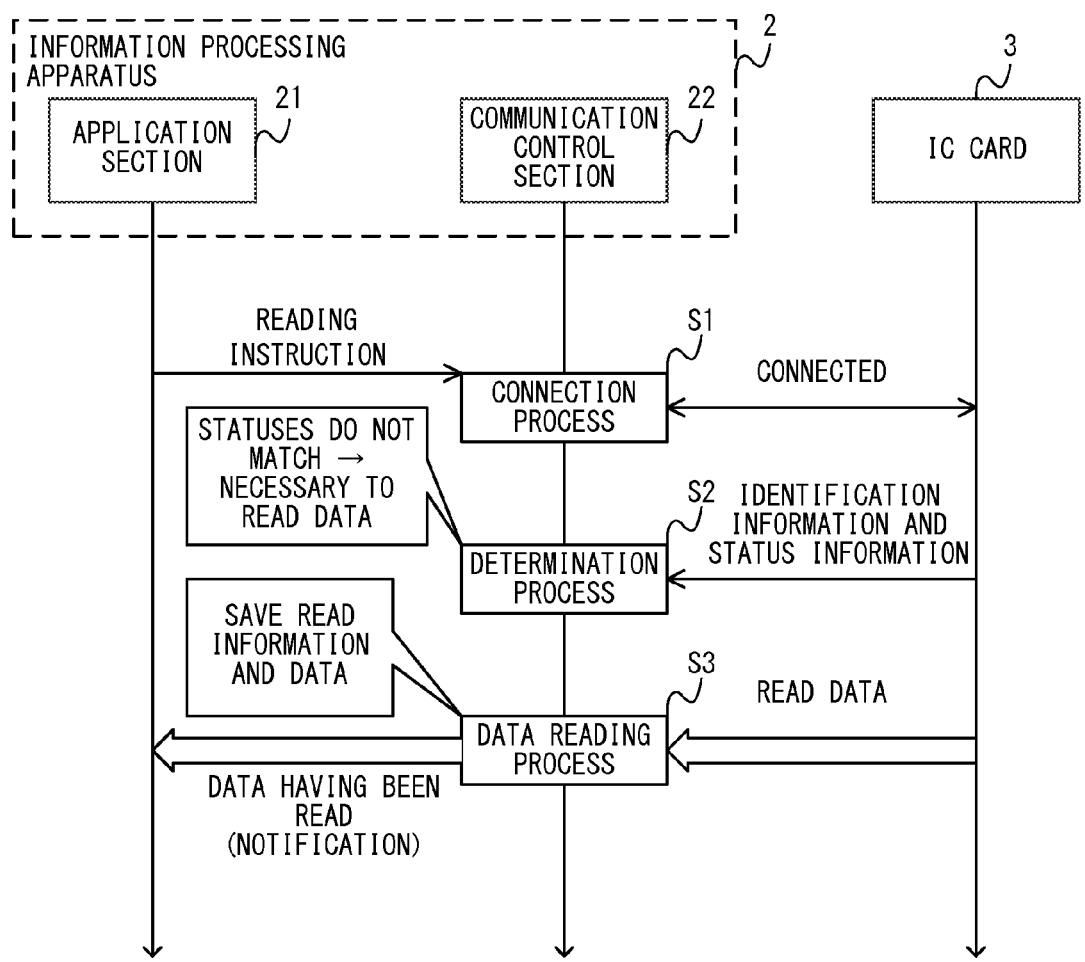
FIG. 3 is a diagram showing a non-limiting example of the flow of the operation of the communication system in the case where the information processing apparatus and the communication target communicate with each other for the first time.

In this section, examples of the operation of the communication system 1 in some cases are described. First, with reference to FIGS. 2 and 3, a description is given of the operation in the case where the information processing apparatus 2 and the IC card 3 communicate with each other for the first time (case A). FIG. 2 is a diagram showing states before and after the operation of the communication system 1 in case A. FIG. 3 is a diagram showing the flow of the operation of the communication system 1 in case A. With reference to FIGS. 2 and 3, the case is considered where the information processing apparatus 2 reads data A, which is the main data 19, from the IC card 3.

A state (a) shown in FIG. 2 is a state before the information processing apparatus 2 and the IC card 3 communicate with each other. In the state (a), the IC card 3 stores "data A" as the main data and stores "n" (n is a natural number) as the value of a counter C, which is the status information. Further, the information processing apparatus 2 has not communicated with the IC card 3 in the past. Thus, the information processing apparatus 2 does not store the main data (the data A) of the IC card 3 or the status information (the counter C) of the IC card 3 (see FIG. 2).

In the state (a), first, the application section 21 sends the communication control section 22 an instruction to read data (see FIG. 3). The communication control section 22 performs a connection process in accordance with the reading instruction (step S1). The connection process may include any specific content. For example, the communication control section 22 performs the process of sensing the IC card 3 present around the communication section 11 (for example, a polling process), and the process of establishing communication with the sensed IC card 3 (for example, the process of acquiring information necessary for data communication from the IC card 3).

If communication has been established by the connection process, as shown in FIG. 3, the communication control section 22 performs a determination process (step S2). In the determination process, the communication control section 22 first reads the identification information and the status information from the IC card 3. Thus, in accordance with the fact that, as a result of the IC card 3 coming close to the information processing apparatus 2, the information processing apparatus 2 has become capable of performing near field communication with the IC card 3, the information processing apparatus 2 (the communication control section 22) reads the identification information and the status information of the IC card 3 from the IC card 3 (the same applies to cases B through D described later).

On the basis of the read identification information and status information, the communication control section 22 determines whether or not it is necessary to read the main data from the IC card 3. This determination is the process of determining whether or not the main data has already been acquired from the IC card 3 having become capable of communicating. Although described in detail later, the determination is made on the basis of whether or not the status information acquired when the information processing apparatus 2 has previously accessed the IC card 3 matches the status information currently read from the IC card 3. It should be noted that the identification information is used to identify the IC card 3 (described in detail later).

It should be noted that the case where the main data has already been acquired is the case where the information processing apparatus 2 has read in the past the main data stored in the IC card 3 (case B described later), or the case where the main data stored in the IC card 3 has been written by the information processing apparatus 2 in the past (case C described later). In case A, the information processing apparatus 2 has not acquired the status information of the IC card 3 (see FIG. 2), it is determined that the two pieces of status information described above do not match each other. As a result, the communication control section 22 determines that it is necessary to read the main data.

After the determination process, the communication control section 22 performs a data reading process (step S3). The data reading process is the process of reading the main data from the IC card 3, where necessary, and passing the read data to an application. A state (b) shown in FIG. 2 is a state after the data reading process has been performed in the state (a). As described above, in case A, it is determined that it is necessary to read the main data. Thus, in the data reading process, the communication control section 22 reads the main data (the data A) from the IC card 3 (see FIGS. 2 and 3). Then, the communication control section 22 passes the read main data to the application section 21. Further, at this time, the communication control section 22 saves the identification information, the status information (C=n), and the main data (the data A) that have been read from the IC card 3.

By the above operation, in case A, the main data is read from the IC card 3 and used by the application section 21. It should be noted that the application section 21 deletes the acquired main data at appropriate timing. For example, if processing using the main data has been completed, or if the application has been ended, the application section 21 deletes the main data. Thus, there is a case where the application section 21 attempts to acquire again the main data acquired once from the IC card 3. On the other hand, the communication control section 22 saves the main data regardless of whether or not the application section 21 has deleted the main data (even if the application section 21 has deleted the main data).

It should be noted that in the exemplary embodiment, the application section 21 and the communication control section 22 may transfer data to each other by actually transmitting (outputting) data to the other, or by notifying the other that data to be transferred has been generated. For example, in the data reading process, the communication control section 22 may notify that the main data has been read (the main data has been stored in a predetermined location in the memory 14). Further, if the application section 21 and the communication control section 22 save the same data (for example, the "data A" shown in FIG. 2), in practice, each section does not need to separately save the data, and the memory 14 may save the same data. In this case, the application section 21 deleting the data means that the application section 21 stops managing the data stored in the memory 14, but does not mean that the data is deleted from the memory 14.

(Case B: Case Where Data Has Already Been Read)

Figure 4:
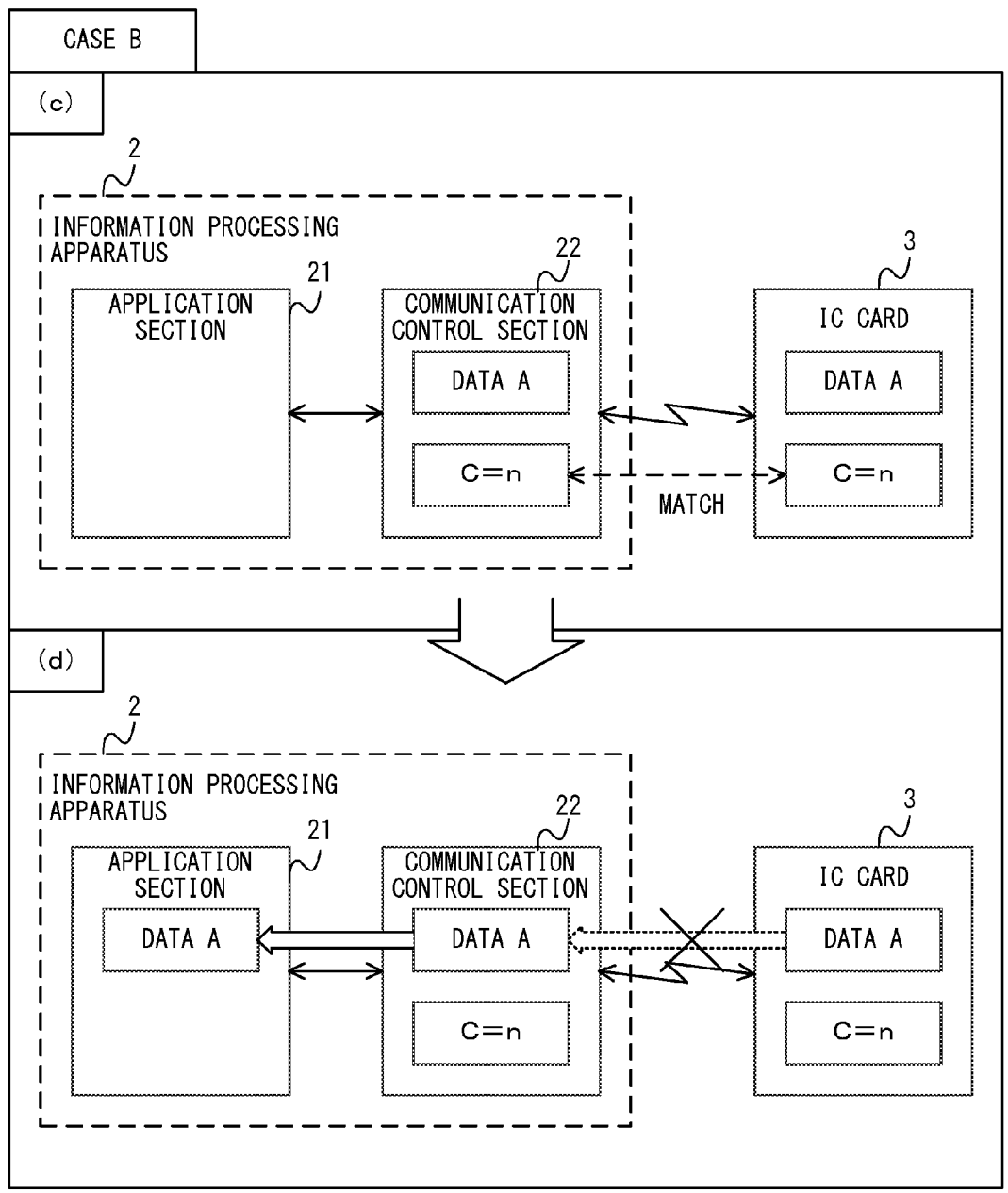
FIG. 4 is a diagram showing non-limiting examples of states before and after the operation of the communication system in the case where the information processing apparatus has already acquired main data from the communication target.
Figure 5:
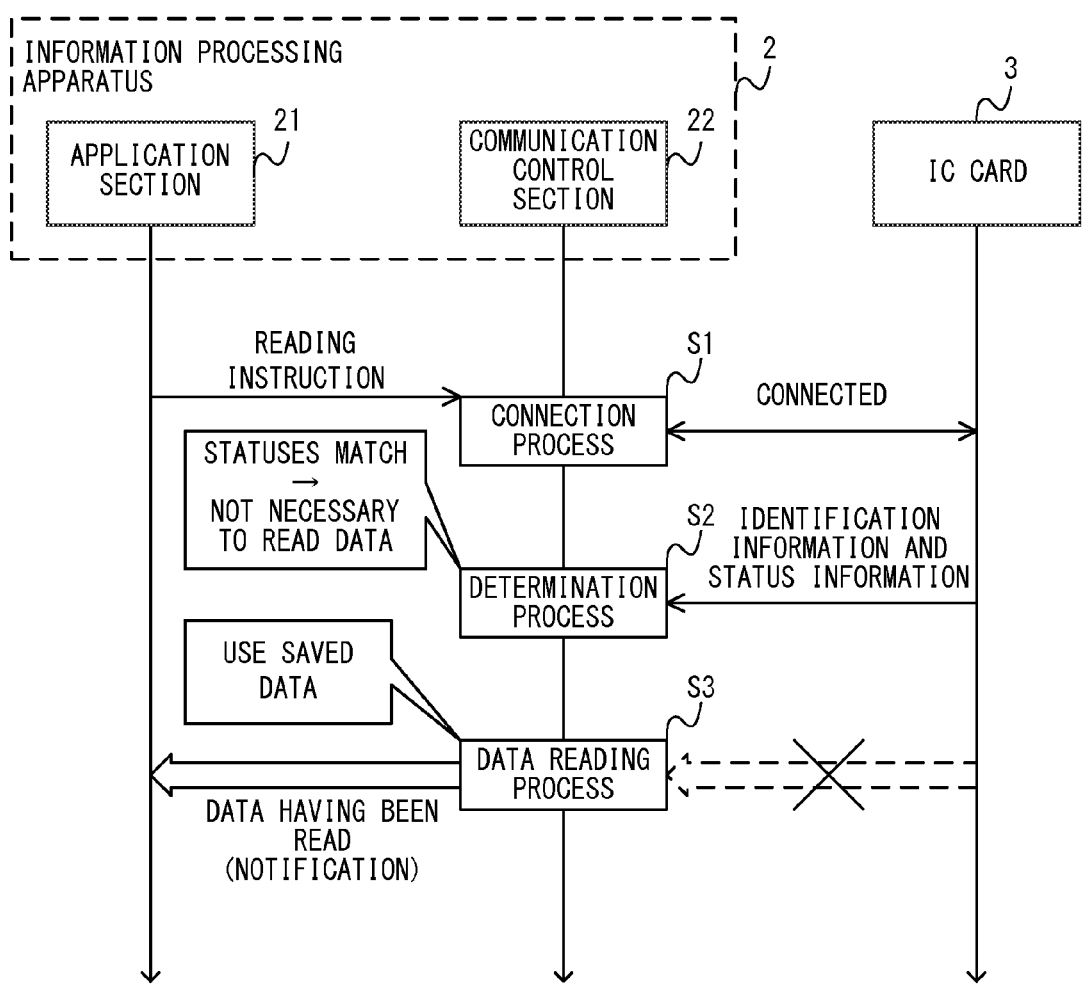
FIG. 5 is a diagram showing a non-limiting example of the flow of the operation of the communication system in the case where the information processing apparatus has already acquired the main data from the communication target.

Next, with reference to FIGS. 4 and 5, a description is given of the operation in the case where the information processing apparatus 2 has already acquired (has already read) the main data from the IC card 3 (case B). FIG. 4 is a diagram showing states before and after the operation of the communication system 1 in case B. FIG. 5 is a diagram showing the flow of the operation of the communication system 1 in case B. In case B, the case is considered where, after the information processing apparatus 2 has acquired the main data by the operation shown in FIG. 3 described above, the application section 21 sends again the communication control section 22 an instruction to read data.

A state (c) shown in FIG. 4 is a state before the information processing apparatus 2 and the IC card 3 communicate with each other. It is assumed that in the state (c), the application section 21 does not hold the main data (the data A) (has deleted the main data after the state (b)). Meanwhile, in the state (c), the data stored in the communication control section 22 and the IC card 3 is the same as that in the state (b).

In the state (c), if the application section 21 has sent the communication control section 22 an instruction to read data, the communication control section 22 performs a connection process similarly to case A (step S1 shown in FIG. 5). This establishes communication between the communication control section 22 and the IC card 3. If communication has been established, the communication control section 22 performs a determination process similarly to case A (step S2 shown in FIG. 5). That is, the communication control section 22 reads the identification information and the status information from the IC card 3, and determines whether or not it is necessary to read the main data from the IC card 3.

Here, in case B, the currently read status information matches the status information acquired when the communication control section 22 has previously accessed the IC card 3 (the status information saved in the communication control section 22) (see FIG. 4). As a result, in the determination process performed in case B, it is determined that it is not necessary to read the main data.

After the determination process, the communication control section 22 performs a data reading process (step S3 in shown in FIG. 5). It should be noted that a state (d) shown in FIG. 4 is a state after the data reading process has been performed in the state (c). As described above, in case B, it is determined that it is not necessary to read the main data. Thus, in the data reading process, the communication control section 22 does not read the main data (the data A) from the IC card 3 (see FIGS. 4 and 5). In case B, the main data has been read in the past and is saved, and therefore, it is not necessary to read the main data. Thus, the communication control section 22 uses the saved main data as the main data read from the IC card 3. That is, the saved main data is passed to the application section 21. As described above, if the information processing apparatus 2 has already acquired the main data, the reading of the data from the IC card 3 is omitted.

It should be noted that either when the result of the determination in the determination process is affirmative or when the result of the determination in the determination process is negative (in either case A or B), any operation may be performed by the information processing apparatus 2 after the data reading process. For example, after the data reading process, the communication control section 22 may end the communication with the IC card 3 and wait for an instruction from the application section 21. Alternatively, for example, the communication control section 22 may repeatedly perform the series of processes of the above steps S1 through S3. It should be noted that in this case, in and after the second repetition of the series of processes of the above steps S1 through S3, the reading of the data from the IC card 3 is omitted unless the IC card 3 is changed.

As described above using cases A and B as examples, in the exemplary embodiment, if the IC card 3 capable of communicating has appeared (the IC card 3 has come close to the information processing apparatus 2), the information processing apparatus 2 reads the identification information and the status information and determines, on the basis of the identification information and the status information, whether or not it is necessary to read the main data (step S2). Based on this, if it has been determined that it is not necessary to read the main data, the information processing apparatus 2 can perform appropriate processing such as the omission of communication. This enables the information processing apparatus 2 and the IC card 3 to efficiently communicate with each other.

Specifically, in the exemplary embodiment, if it has been determined that the main data has already been acquired, the communication control section 22 does not read the main data from the IC card 3 (case B). If it has been determined the main data has not yet been acquired, the communication control section 22 reads the main data from the IC card 3 (case A). This makes it possible to omit the process of reading unnecessary data. This makes it possible to improve the processing speed of an application regarding the reading of data, or reduce the power consumption required for near field communication.

In addition, in the exemplary embodiment, if data (main data) has been read from the IC card 3, the communication control section 22 saves the read data in a storage section of the information processing apparatus 2 (FIGS. 2 and 3). Then, in the subsequent determination process, if it has been determined that the data has already been acquired from the IC card 3, the communication control section 22 uses, as the data read from the IC card 3, the data saved in the storage section (the memory 14) (FIGS. 4 and 5). This enables the information processing apparatus 2 (the application section 21) to perform processing using the main data even if omitting the reading of the main data from the IC card 3.

(Case C: Case Where Data is Written)

Figure 6:
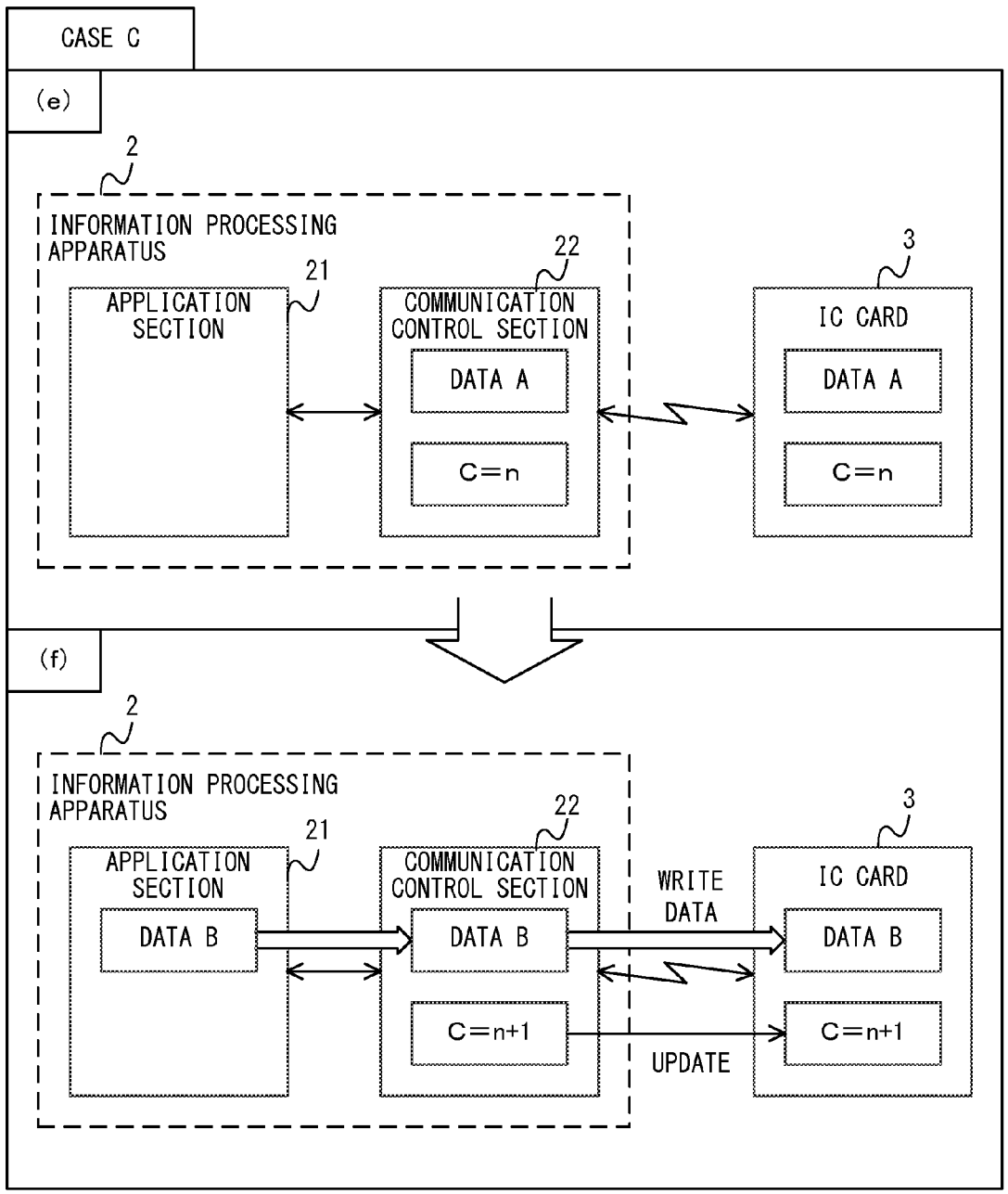
FIG. 6 is a diagram showing non-limiting examples of states before and after the operation of the communication system in the case where the information processing apparatus writes data to the communication target.
Figure 7:
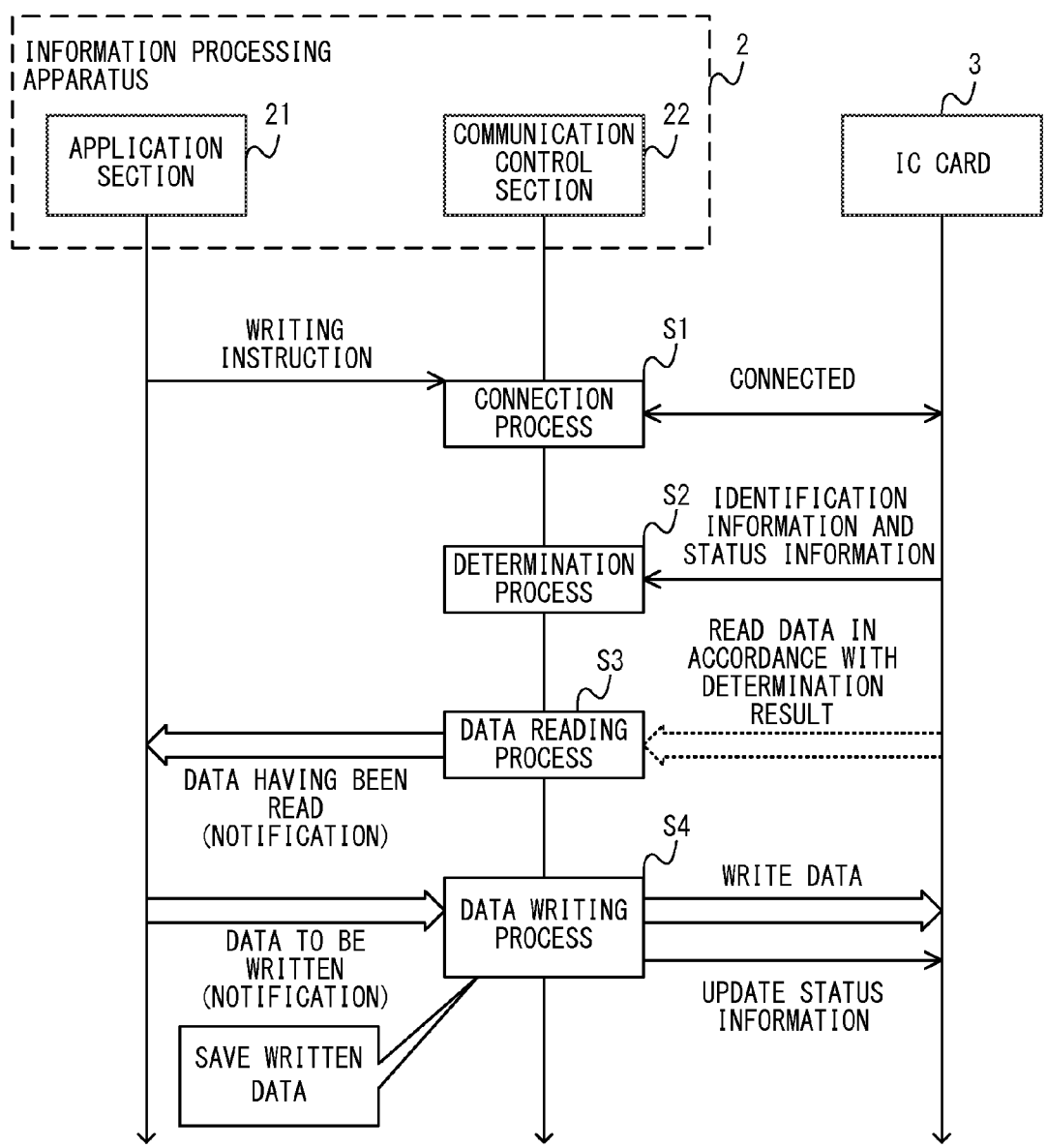
FIG. 7 is a diagram showing a non-limiting example of the flow of the operation of the communication system in the case where the information processing apparatus writes data to the communication target.

Next, with reference to FIGS. 6 and 7, a description is given of the operation in the case where the information processing apparatus 2 writes data to the IC card 3 (case C). FIG. 6 is a diagram showing states before and after the operation of the communication system 1 in case C. FIG. 7 is a diagram showing the flow of the operation of the communication system 1 in case C. In case C, the case is considered where the application section 21 sends the communication control section 22 an instruction to write data.

A state (e) shown in FIG. 6 is a state before the information processing apparatus 2 and the IC card 3 communicate with each other. It is assumed that in the state (e), the data stored in the communication control section 22 and the IC card 3 is the same as that in the state (b).

In the state (e), if the application section 21 has sent the communication control section 22 an instruction to write data, a connection process (step S1) is performed similarly to the case of the reading instruction.

Here, as described above, in the exemplary embodiment, data is written to (and read from) the IC card 3 with the entirety of the main data as a unit. That is, when writing data to the IC card 3, the communication control section 22 first reads the main data from the IC card 3. Next, the application section 21 rewrites a necessary portion of the read main data. Finally, the communication control section 22 writes the data obtained by the rewriting as the main data to the IC card 3, so as to replace the read main data.

As described above, in the exemplary embodiment, also when data is written, the process of reading the main data from the IC card 3 (a data reading process) is performed first. Further, also in the data reading process when data is written, a determination process (step S2) is performed before the data reading process (step S3), in order to omit the reading of the data from the IC card 3 (see FIG. 7). That is, after a connection process, the communication control section 22 performs the determination process (step S2) and the data reading process (step S3) similarly to the case of the reading instruction. It should be noted that in case C, similarly to case B, the status information saved in the communication control section 22 matches the status information of the IC card 3. This enables the communication control section 22 to omit the reading of the main data. It should be noted that the operation of the data reading process in the case where the status information saved in the communication control section 22 does not match the status information of the IC card 3 is similar to that in case A.

As described above, in the exemplary embodiment, even when the information processing apparatus 2 reads the main data prior to the operation of writing the main data to the IC card 3, it is possible to omit the reading of the main data from the IC card 3. This enables the communication system 1 to efficiently perform communication In case C, when having acquired the main data from the communication control section 22, the application section 21 generates main data obtained by rewriting ("data B" in FIG. 6), using the acquired main data. Further, after the data reading process, the communication control section 22 performs a data writing process (step S4 shown in FIG. 7). It should be noted that a state (f) shown in FIG. 6 is a state after the data writing process has been performed in the state (e). When writing new main data, the communication control section 22 receives from the application section 21 the main data to be written (the "data B", which is the main data obtained by the rewriting), and writes the received main data to the IC card 3.

In addition, when data is written to the IC card 3, the communication control section 22 updates the content of the status information stored in the IC card 3 (see FIGS. 6 and 7). That is, the communication control section 22 writes the updated status information to the IC card 3. In the example shown in FIG. 6, the value of the counter C of the IC card 3 is incremented by 1 (updated from "n" to "n+1"). This makes it possible to cause the status information 18 of the IC card 3 to accurately indicate the number of times data has been written. Further, when the information processing apparatus 2 reads the main data from the IC card 3 next, similarly to case B, the status information saved in the communication control section 22 matches the status information of the IC card 3. This enables the communication control section 22 to omit the reading of the main data.

It should be noted that the status information 18 is updated not only by the information processing apparatus 2, but also by any information processing apparatus that writes data to the IC card 3. That is, even if data has been written by another information processing apparatus different from the information processing apparatus 2, the status information 18 of the IC card 3 is updated. As a result, the status information 18 accurately indicates the number of times data has been written to the IC card 3.

In addition, when data is written to the IC card 3, the communication control section 22 saves the data in the storage section (the memory 14). In the example shown in FIG. 6, the communication control section 22 saves the written data B in the memory 14. This enables the information processing apparatus 2 (the application section 21) to perform processing using the main data, even if the information processing apparatus 2 omits the reading of the main data when reading the main data from the IC card 3.

(Case D: Case Where Data Has Been Rewritten by Another Apparatus)

Figure 8:
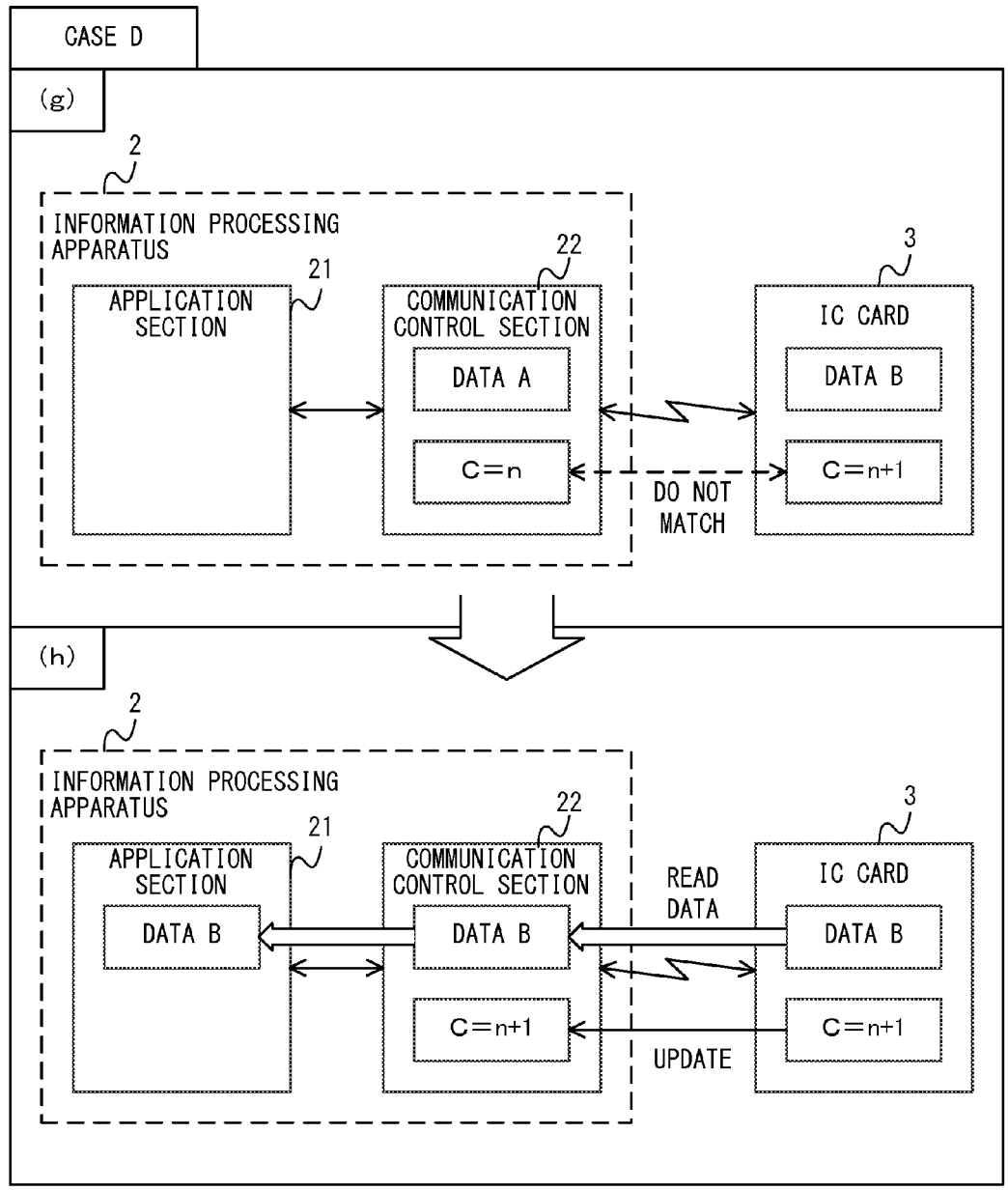
FIG. 8 is a diagram showing non-limiting examples of states before and after the operation of the communication system in the case where another apparatus has rewritten the main data of the communication target.

Next, with reference to FIG. 8, a description is given of the operation in the case where the main data of the IC card 3 has been rewritten by another apparatus (case D). FIG. 8 is a diagram showing states before and after the operation of the communication system 1 in case D. In case D, the case is considered where, after the main data of the IC card 3 has been acquired by the information processing apparatus 2 by the operation in case A, the main data of the IC card 3 is rewritten by another apparatus, and thereafter, the information processing apparatus 2 reads data from the IC card 3 again.

A state (g) shown in FIG. 8 is a state before the information processing apparatus 2 and the IC card 3 communicate with each other. It is assumed that in the state (g), the application section 21 does not hold the main data (has deleted the main data after the state (b)). In the state (g), the data stored in the communication control section 22 is the same as that in the state (b). Further, it is assumed that as a result of the main data being rewritten by the other apparatus, the IC card 3 stores the data B as the main data and stores "n+1" as the value of the counter C, which is the status information.

The flow of the operation of the communication system 1 in case D is the same as that in case A (FIG. 3). That is, in the state (g), if the application section 21 has sent the communication control section 22 an instruction to read data, the communication control section 22 performs a connection process (step S1) and a determination process (step S2) similarly to the state (a). Here, in case D, the currently read status information (counter C=n+1) does not match the status information acquired when the information processing apparatus 2 has previously accessed the IC card 3 (the status information (counter C=n) saved in the communication control section 22). As a result, in case D, it is determined that it is necessary to read the main data.

A state (h) shown in FIG. 8 is a state after the operation based on a reading instruction has been performed in the state (g). As described above, in case D, it is determined that it is necessary to read the main data. Thus, the operation in a data reading process (step S3) is similar to that in case A (FIGS. 2 and 3). That is, the communication control section 22 reads the main data from the IC card 3 and passes the read main data to the application section 21 (see FIG. 8). Further, at this time, the communication control section 22 saves the identification information, the status information (C=n+1), and the main data (the data B) that have been read from the IC card 3. Thus, when the information processing apparatus 2 reads the main data from the IC card 3 next, similarly to the state (c) shown in FIG. 4, the status information saved in the communication control section 22 matches the status information of the IC card 3. This enables the communication control section 22 to omit the reading of the main data.

As described above, in the exemplary embodiment, if an instruction to communicate with the IC card 3 (a reading instruction and/or a writing instruction) has been given by the application (the application section 21) to be executed by the information processing apparatus 2, the communication control section 22 reads the identification information and the status information from the IC card 3. Then, if it has been determined that data (main data) of the IC card 3 has already been acquired, the communication control section 22 does not read the data from the IC card 3 regardless of the instruction from the application. Thus, in the exemplary embodiment, the application does not need to manage whether or not the data of the IC card 3 has already been acquired. This facilitates the creation of an application. It should be noted that in the exemplary embodiment, if a reading instruction or a writing instruction has been given as an instruction from the application, it is possible to omit the reading of the data regardless of the instruction from the application. Thus, in the exemplary embodiment, when giving a reading instruction or a writing instruction, the application can easily perform efficient near field communication without performing the above management.

(2-2: Status Information)

In the exemplary embodiment, the status information 18 is counter information indicating the number of times data has been written to the IC card 3. More specifically, the status information 18 indicates the total number of times data is written to the IC card 3. That is, if data has been written to the IC card 3, the status information 18 of the IC card 3 is incremented by 1.

It should be noted that the status information 18 may be any information uniquely set in accordance with the number of times data has been written to the IC card 3. For example, in another embodiment, the status information 18 may be time information (for example, a timestamp) indicating the time when data has been written to the IC card 3. If the status information 18 is the counter information and/or the time information, the information processing apparatus 2 can easily set the status information 18. It should be noted that "uniquely set in accordance with the number of times data has been written" means the indication of a value varied depending on the number of times data has been written, but does not require uniqueness in a strict sense. For example, the status information 18 may be information substantially uniquely set in accordance with the number of times data has been written, and may be, for example, a hash value or the output value of a CRC (Cyclic Redundancy Check).

In addition, in the exemplary embodiment, the total data size of the identification information 17 and the status information 18 is smaller than the data size of the main data. Thus, by reading information (the identification information 17 and the status information 18) having a relatively small data size, the information processing apparatus 2 can determine whether or not it is necessary to read the main data having a relatively large data size. This makes it possible to significantly reduce the data size of data to be read from the IC card 3, if the reading of the main data is omitted.

(2-3: Determination Method)

Next, a determination method in the determination process (step S2) is described. The determination method in the determination process may be any method. In the exemplary embodiment, the determination is made on the basis of whether or not the status information previously read from the IC card 3 by the information processing apparatus 2 matches the currently read status information.

Specifically, the communication control section 22 saves, among the pieces of status information read from the IC card 3, the latest status information in the storage section (the memory 14) of the information processing apparatus 2 in association with the identification information with respect to each IC card 3. That is, as described above, in any of the following cases (a) through (c), the communication control section 22 saves the status information newly acquired from the IC card 3.

(a) the case where the communication control section 22 does not save the status information of the IC card 3 (case A)

(b) the case where the status information of the IC card 3 is updated in accordance with the writing of data (case C)

(c) the case where the status information saved in the communication control section 22 is different from the status information of the IC card 3 (case D)

In the exemplary embodiment, the communication control section 22 saves as a status information table a set of the identification information and the status information that have been read from the IC card 3. FIG. 9 is a diagram showing an example of the status information table. As shown in FIG. 9, in the status information table, the identification information indicating an IC card 3 and the status information (counter information) of the IC card 3 are stored in association with each other with respect to each IC card 3.

If the identification information and the status information have been read from the IC card 3 in the determination process, the communication control section 22 determines whether or not the read status information matches the saved status information of the IC card 3 corresponding to the read identification information. In the exemplary embodiment, the communication control section 22 determines whether or not the value of the read status information matches the value of the status information associated with the read identification information in the status information table. It should be noted that if the read identification information is not included in the status information table, the communication control section 22 determines that the read status information and the saved status information do not match each other.

If the read status information and the saved status information match each other, the communication control section 22 determines that it is not necessary to read the main data. If, on the other hand, the read status information and the saved status information do not match each other, the communication control section 22 determines that it is necessary to read the main data. This makes it possible to easily determine whether or not it is necessary to read the main data.

It should be noted that in any of the above cases (a) through (c), a set of the identification information and the status information is updated and saved. In the exemplary embodiment, the communication control section 22 updates the content of the status information table. That is, a set of new identification information and new status information is newly added to the status information table. At this time, if the same identification information as the new identification information is already included in the status information table, a set of the older identification information and the older status information is deleted. This enables the communication control section 22 to save, among the pieces of status information read from the IC card 3, the latest status information in the memory 14 in association with the identification information with respect to each IC card 3.

[3. Details of Information Processing Performed by Communication System]

(3-1: Data Used in Information Processing)

Figure 12:
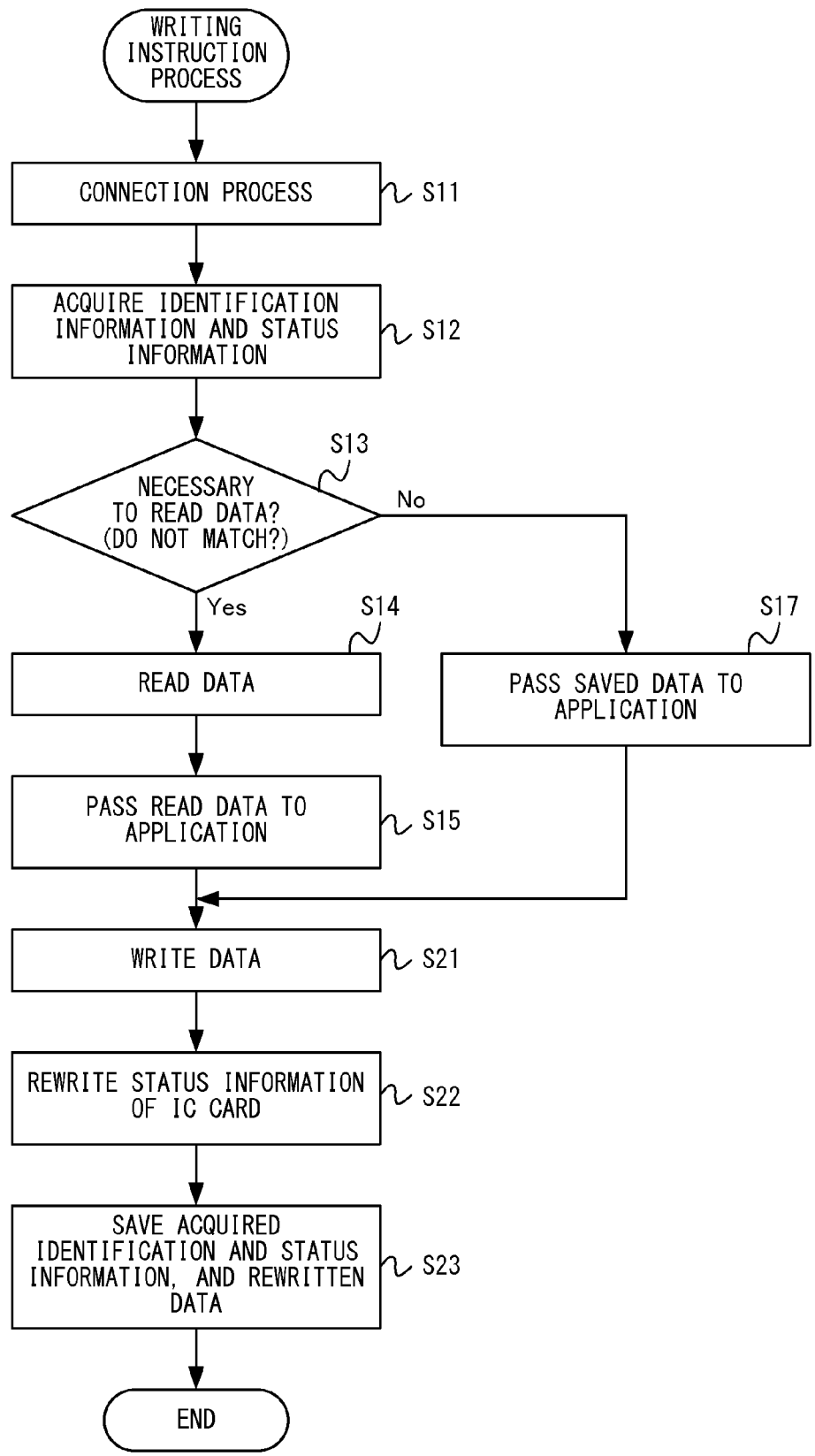
FIG. 12 is a flow chart showing a non-limiting example of the flow of a writing instruction process performed by the information processing apparatus.

With reference to FIGS. 10 and 12, a description is given below of an example of specific processing performed by the communication system 1 (the information processing apparatus 2) in the exemplary embodiment. FIG. 10 is a diagram showing an example of a data area set in the memory 14 of the information processing apparatus 2 in the exemplary embodiment. As shown in FIG. 10, the memory 14 of the information processing apparatus 2 has a program storage area 31 and a processing data storage area 34.

In the program storage area 31, various programs to be executed by the information processing apparatus 2 are stored. In the exemplary embodiment, in the program storage area 31, the application program 32 and the communication program 33 described above are stored. It should be noted that FIG. 10 shows only one type of application program. Alternatively, the information processing apparatus 2 may store a plurality of types of application programs. It should be noted that the application program 32 (the communication program 33 likewise) may be stored in advance in a storage device in the information processing apparatus 2, or may be acquired from a storage medium attachable to and detachable from the information processing apparatus 2 and stored in the memory 14, or may be acquired from another apparatus via a network such as the Internet and stored in the memory 14. The CPU 13 executes a program (the application program 32 and/or the communication program 33) stored in the memory 14.

In the processing data storage area 34, various types of data to be used in the information processing performed by the information processing apparatus 2 (information processing shown in FIGS. 11 and 12) are stored. In the exemplary embodiment, in the processing data storage area 34, at least identification information data 35, status information data 36, status information table data 37, and saved data 38 are stored.

The identification information data 35 is data indicating the identification information described above, read from the IC card 3. The status information data 36 is data indicating the status information described above, read from the IC card 3. The status information table data 37 is data indicating the status information table described above, saved in the information processing apparatus 2. The saved data 38 is the main data of the IC card 3, saved in the information processing apparatus 2. That is, the main data read from the IC card 3 or the main data written to the IC card 3 is stored as the saved data 38 in the memory 14. It should be noted that although FIG. 10 shows only one type of saved data 38, the saved data 38 is stored in the memory 14 with respect to each IC card 3 with which the information processing apparatus 2 has communicated in the past. Further, the status information table data 37 and the saved data 38 may be stored in a storage device that holds stored contents even if the information processing apparatus 2 is powered off.

(3-2: Specific Example of Information Processing)

Figure 11:
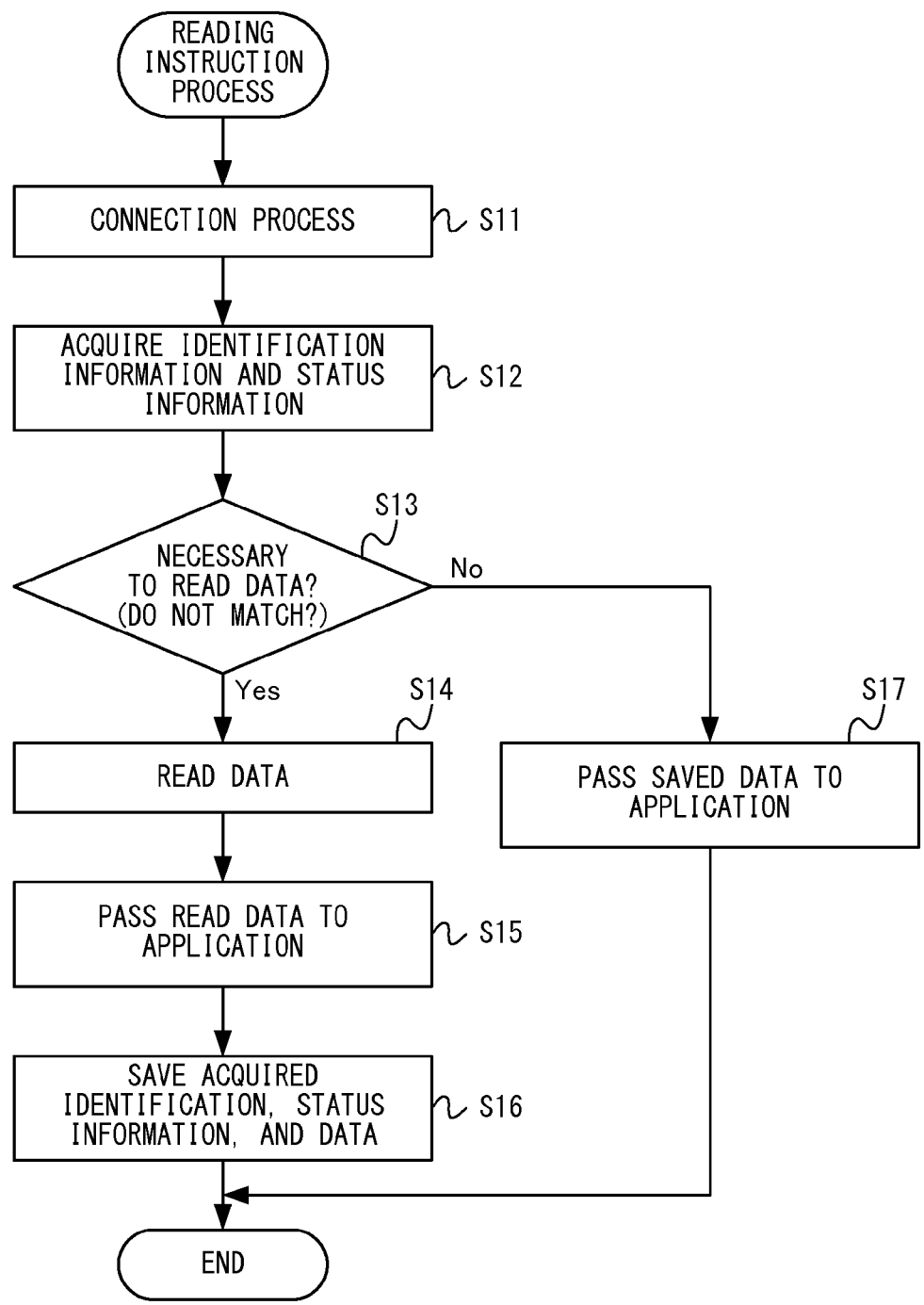
FIG. 11 is a flow chart showing a non-limiting example of the flow of a reading instruction process performed by the information processing apparatus.

Next, with reference to FIGS. 11 and 12, the detailed flow of the information processing according to the exemplary embodiment is described. FIG. 11 is a flow chart showing an example of the flow of the information processing (a reading instruction process) performed by the information processing apparatus 2 (the CPU 13) when the reading instruction has been given in the exemplary embodiment. In the exemplary embodiment, a series of processes shown in FIG. 11 are performed by the CPU 13 executing the communication program 33. Further, the reading instruction process may be started at any timing. In the exemplary embodiment, the reading instruction process is started in accordance with the fact that the reading instruction (regarding near field communication) has been given by an application.

It should be noted that the processes of all the steps in the flow chart shown in FIGS. 11 and 12 are merely illustrative. Thus, the processing order of the steps may be changed, or another process may be performed in addition to (or instead of) the processes of all the steps, so long as similar results are obtained. Further, in the exemplary embodiment, descriptions are given on the assumption that the CPU 13 performs the processes of all the steps in the flow chart. Alternatively, a processor or a dedicated circuit other than the CPU 13 may perform the processes of some of the steps in the flow chart.

In the exemplary embodiment, first, in step S11, the CPU 13 performs the connection process described above (step S1 shown in FIG. 2 and the like). This establishes near field communication between the information processing apparatus 2 and the IC card 3. In the subsequent step S12, the CPU 13 acquires the identification information and the status information from the IC card 3 (step S2 shown in FIGS. 3, 5, and 7). At this time, the CPU 13 stores data of the acquired identification information as the identification information data 35 in the memory 14, and stores data of the acquired status information as the status information data 36 in the memory 14.

In step S13, the CPU 13 determines whether or not it is necessary to read the main data from the IC card 3 (step S2 shown in FIGS. 3, 5, and 7). That is, the CPU 13 reads the identification information data 35, the status information data 36, and the status information table data 37 from the memory 14, and makes the determination using the read pieces of data 35 through 37. It should be noted that in the exemplary embodiment, the determination is made by the method described in the above "2-3: Determination Method". If the determination is affirmative in the above step S13, that is, if it has been determined that it is necessary to read the main data, a series of processes shown in steps S14 through S16 are performed. If, on the other hand, the determination is negative in the above step S13, that is, if it has been determined that it is not necessary to read the main data, the process of step S17 is performed.

In step S14, the CPU 13 reads the main data from the IC card 3 (step S3 shown in FIGS. 3 and 7). In the subsequent step S15, the CPU 13 passes the read main data to the application (step S3 shown in FIGS. 3 and 7). This enables the application to perform information processing using the main data of the IC card 3.

In step S16, the CPU 13 saves the data acquired in steps S12 and S14. That is, the CPU 13 stores the main data acquired in step S14, as the saved data 38 in the memory 14. Further, the status information table is updated so as to include a set of the identification information and the status information that have been acquired in step S12. Specifically, the CPU 13 updates the status information table data 37 on the basis of the identification information data 35 and the status information data 36 that are stored in the memory 14. After step S16, the CPU 13 ends the reading instruction process shown in FIG. 11.

On the other hand, in step S17, the CPU 13 passes the saved main data to the application, as the main data stored in the IC card 3 (step S3 shown in FIG. 5). That is, the CPU 13 notifies the application that the main data is stored as the saved data 38 in the memory 14. Alternatively, the CPU 13 reads the saved data 38 from the memory 14 and outputs the saved data 38 to the application. After step S17, the CPU 13 ends the reading instruction process shown in FIG. 11.

Next, a description is given of information processing performed by the information processing apparatus 2 (the CPU 13) when the writing instruction has been given (a writing instruction process). FIG. 12 is a flow chart showing an example of the flow of the writing instruction process performed by the information processing apparatus 2 (the CPU 13) in the exemplary embodiment. In the exemplary embodiment, a series of processes shown in FIG. 12 are performed by the CPU 13 executing the communication program 33. Further, the writing instruction process may be started at any timing. In the exemplary embodiment, the writing instruction process is started in accordance with the fact that the writing instruction (regarding near field communication) has been given by an application.

Also in the writing instruction process, the processes of steps S11 through S13 are performed similarly to the reading instruction process described above. Further, if the result of the determination is affirmative in step S13, the processes of steps S14 and S15 are performed similarly to the reading instruction process. It should be noted that in the writing instruction process, the process of step S16 is not performed. If, on the other hand, the result of the determination is negative in step S13, the process of step S17 is performed similarly to the reading instruction process described above. In the writing instruction process, after step S15 or S17, the CPU 13 performs the process of step S21 described later.

In step S21, the CPU 13 writes data to the IC card 3 (step S4 shown in FIG. 7). That is, in the writing instruction process, the application generates data obtained by rewriting, using the data passed from the application in step S15 or S17. In step S21, the CPU 13 writes to the IC card 3 the main data rewritten by the application. In the subsequent step S22, the CPU 13 updates the content of the status information stored in the IC card 3 (step S4 shown in FIG. 7).

In step S23, the CPU 13 saves the pieces of information acquired in step S12 and the data written in step S22 (see FIGS. 6 and 7). The process of saving the identification information and the status information that have been acquired in step S12 is the same as that in step S16. Further, the CPU 13 stores, as the saved data 38 in the memory 14, the main data written to the IC card 3 in step S22. After step S23, the CPU 13 ends the writing instruction process shown in FIG. 12.

As described above, in the exemplary embodiment, if a reading instruction or a writing instruction has been given, it is possible to omit the reading of the data from the IC card 3. It should be noted that in another embodiment, an instruction given by an application is not only the reading instruction or the writing instruction, but also an instruction including any content. Based on the communication method according to the exemplary embodiment, in any case where the operation of reading data (main data) from the IC card 3 in accordance with an instruction is performed, the reading of the data from the IC card 3 may be omitted. Thus, it is possible to efficiently perform communication.

[4. Variation]

In the above embodiment, data is read from and written to the communication target (IC card) 3 with the entirety of the main data as a unit. Here, in another embodiment, data may be read from and written to the communication target 3 with respect to a plurality of predetermined units. In other words, the communication target 3 may store a plurality of pieces of main data, each of which is a unit of reading and writing data. In this case, the identification information and the status information may be set with respect to each predetermined unit (with respect to each piece of main data). This enables the information processing apparatus 2 to determine, with respect to a plurality of units of storage, whether or not the pieces of main data have already been acquired.

As described above, the exemplary embodiment can be used as, for example, a portable device that performs near field communication with a communication target, a communication program to be executed by a portable device, and the like in order, for example, to efficiently perform near field communication with a communication target.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium comprising a communication program to be executed by a computer of an information processing apparatus capable of performing near field communication with a communication target, the communication target having stored therein main data to be read, identification information unique to each communication target, and status information set in accordance with writing of the main data to the communication target, the communication program causing the computer to:

as a result of the communication target coming close to the information processing apparatus, and the information processing apparatus thereby becoming capable of performing near field communication with the communication target, read the identification information and the status information of the communication target from the communication target; and determine, using the computer of the information processing apparatus and on the basis of the read identification information and status information, whether or not it is necessary to read the main data from the communication target.

2. The non-transitory computer-readable storage medium according to claim 1, wherein on the basis of the read identification information and status information, it is determined whether or not the main data from the communication target having become capable of communicating with the information processing apparatus has already been acquired, thereby determining whether or not it is necessary to read the main data from the communication target.

3. The non-transitory computer-readable storage medium according to claim 2, the communication program further causing the computer to:

if it has been determined that the main data has already been acquired, not read the main data from the communication target; and if it has been determined that the main data has not yet been acquired, read the main data from the communication target.

4. The non-transitory computer-readable storage medium according to claim 3, the communication program further causing the computer to:

if the main data has been read from the communication target, save the read main data in a storage device of the information processing apparatus, wherein if it has been determined that the main data has already been acquired, the main data saved in the storage device is used as the main data read from the communication target.

5. The non-transitory computer-readable storage medium according to claim 4, wherein when the main data is written to the communication target, the main data is saved in the storage device.

6. The non-transitory computer-readable storage medium according to claim 3, wherein when an instruction to communicate with the communication target has been given by an application executed by the information processing apparatus, the identification information and the status information are read from the communication target; and if it has been determined that the main data has already been acquired, the main data is not read from the communication target.

7. The non-transitory computer-readable storage medium according to claim 6, wherein when an instruction to read the main data from the communication target has been given by the application, the identification information and the status information are read from the communication target; and if it has been determined that main data has already been acquired, the main data is not read from the communication target.

8. The non-transitory computer-readable storage medium according to claim 6, wherein when an instruction to rewrite the main data to the communication target has been given by the application, the identification information and the status information are read from the communication target; and if it has been determined that the main data has not yet been acquired, the main data to be rewritten is read from the communication target, and if it has been determined that the main data has already been acquired, the main data is not read from the communication target.

9. The non-transitory computer-readable storage medium according to claim 1, the communication program further causing the computer to:

save the read status information in a storage device of the information processing apparatus in association with the identification information with respect to each communication target, wherein regarding the communication target corresponding to the identification information read from the communication target, if the read status information matches the status information saved in the storage device, it is determined that it is not necessary to read the main data, and if the read status information does not match the status information saved in the storage section, it is determined that it is necessary to read the main data.

10. The non-transitory computer-readable storage medium according to claim 1, the communication program further causing the computer to:

update, when the main data is written to the communication target, a content of the status information stored in the communication target.

11. The non-transitory computer-readable storage medium according to claim 1, wherein the status information is information uniquely set in accordance with the number of times data has been written to the communication target.

12. The non-transitory computer-readable storage medium according to claim 11, wherein the status information is at least one of counter information indicating the number of times data has been written to the communication target and time information indicating a time when data has been written to the communication target.

13. The non-transitory computer-readable storage medium according to claim 1, wherein a total data size of the identification information and the status information is smaller than a data size of the main data.

14. The non-transitory computer-readable storage medium according to claim 1, wherein the status information includes a number of times data has been written to the communication target, and the determination is made based on whether the status information previously read from the communication target matches the status information currently read from the communication target.

15. An information processing apparatus capable of performing near field communication with a communication target, the communication target having stored therein main data to be read, identification information unique to each communication target, and status information set in accordance with writing of the main data to the communication target, the information processing apparatus comprising at least one processor, the information processing apparatus configured to:

as a result of the communication target coming close to the information processing apparatus, and the information processing apparatus thereby becoming capable of performing near field communication with the communication target, read the identification information and the status information of the communication target from the communication target; and determine, using the at least one processor of the information processing apparatus and on the basis of the read identification information and status information, whether or not it is necessary to read the main data from the communication target.

16. A communication system comprising an information processing apparatus and a communication target capable of performing near field communication with the information processing apparatus, the communication target having stored therein main data to be read, identification information unique to each communication target, and status information set in accordance with writing of the main data to the communication target, the information processing apparatus having at least one processor, the information processing apparatus configured to:

as a result of the communication target coming close to the information processing apparatus, and the information processing apparatus thereby becoming capable of performing near field communication with the communication target, read the identification information and the status information of the communication target from the communication target; and determine, using the at least one processor of the information processing apparatus and on the basis of the read identification information and status information, whether or not it is necessary to read the main data from the communication target.

17. A communication method to be performed by an information processing apparatus having at least one processor, the information processing apparatus capable of performing near field communication with a communication target, the communication target having stored therein main data to be read, identification information unique to each communication target, and status information set in accordance with writing of the main data to the communication target, the method comprising:

as a result of the communication target coming close to the information processing apparatus, and the information processing apparatus thereby becoming capable of performing near field communication with the communication target, reading the identification information and the status information of the communication target from the communication target; and determining, using the at least one processor of the information processing apparatus and on the basis of the read identification information and status information, whether or not it is necessary to read the main data from the communication target.

\* \* \* \* \*